United States Patent
Tomatsu

(10) Patent No.: US 10,006,481 B2
(45) Date of Patent: Jun. 26, 2018

(54) BOSS FOR SELF-TAPPING SCREW

(71) Applicant: Brother Kogyo Kabushiki Kaisha, Nagoya-shi, Aichi-ken (JP)

(72) Inventor: Yoshiya Tomatsu, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 222 days.

(21) Appl. No.: 14/952,139

(22) Filed: Nov. 25, 2015

(65) Prior Publication Data

US 2016/0146237 A1    May 26, 2016

(30) Foreign Application Priority Data

Nov. 26, 2014  (JP) ................................. 2014-238712

(51) Int. Cl.
| | |
|---|---|
| *F16B 37/12* | (2006.01) |
| *F16B 37/04* | (2006.01) |
| *F16B 37/00* | (2006.01) |
| *F16B 13/02* | (2006.01) |

(52) U.S. Cl.
CPC ............ *F16B 37/005* (2013.01); *F16B 13/02* (2013.01); *F16B 37/122* (2013.01)

(58) Field of Classification Search
None
See application file for complete search history.

(56) References Cited

U.S. PATENT DOCUMENTS

| | | | | |
|---|---|---|---|---|
| 3,123,389 A | * | 3/1964 | Biesecker | F16B 5/10 |
| | | | | 292/218 |
| 3,137,186 A | * | 6/1964 | Rosan | B21H 3/00 |
| | | | | 29/240.5 |
| 3,221,790 A | * | 12/1965 | Poupitch | F16B 39/34 |
| | | | | 411/301 |
| 3,358,728 A | * | 12/1967 | Hughes | F16B 37/048 |
| | | | | 411/180 |
| 3,370,631 A | * | 2/1968 | James | F16B 35/065 |
| | | | | 411/188 |

(Continued)

FOREIGN PATENT DOCUMENTS

| | | |
|---|---|---|
| JP | S52-2068 U | 1/1977 |
| JP | S54-18606 U | 2/1979 |

(Continued)

OTHER PUBLICATIONS

Apr. 17, 2018—(JP) Notice of Reasons for Rejection—App 2014-238712, Eng Tran.

*Primary Examiner* — Joshua J Michener
*Assistant Examiner* — Kyle J. Walraed-Sullivan
(74) *Attorney, Agent, or Firm* — Banner & Witcoff, Ltd.

(57) ABSTRACT

A boss for a self-tapping screw includes a main body having an inner peripheral surface and an outer peripheral surface, a plurality of reinforcing ribs connected with an outer peripheral surface, and a plurality of inner wall portions extending parallel to the central axis. Each of the plurality of inner wall portions are disposed at a portion of the inner peripheral surface opposite to a corresponding one of the plurality of reinforcing ribs across the main body. Each of the plurality of inner wall portions includes a specific portion opposite to the corresponding one of the plurality of reinforcing ribs across the main body. The specific portion is closer to the central axis than other portions of the each of the inner wall portions.

10 Claims, 6 Drawing Sheets

(56) References Cited

U.S. PATENT DOCUMENTS

| | | | | |
|---|---|---|---|---|
| 3,545,332 A | * | 12/1970 | Tinnerman | F16B 33/00 411/6 |
| 3,722,565 A | * | 3/1973 | Miller, Jr. | A47B 91/024 248/188.4 |
| 4,055,929 A | * | 11/1977 | Stancati | E04B 1/4121 411/437 |
| 4,266,453 A | * | 5/1981 | Farley | B25B 23/0035 403/294 |
| 4,706,831 A | * | 11/1987 | Williams, Jr. | F16B 37/005 220/3.2 |
| 4,749,318 A | * | 6/1988 | Bredal | F16B 13/02 411/180 |
| 5,016,461 A | * | 5/1991 | Walker | B21D 28/06 470/21 |
| 5,071,299 A | * | 12/1991 | Sekine | F16B 37/065 29/444 |
| 5,139,380 A | * | 8/1992 | Reynolds | B21D 53/24 411/437 |
| 5,411,228 A | * | 5/1995 | Morawa | F16L 3/04 174/135 |
| 5,697,744 A | * | 12/1997 | Medal | B29C 65/08 156/73.1 |
| 5,752,793 A | * | 5/1998 | Wu | F16B 39/34 411/303 |
| 5,879,115 A | * | 3/1999 | Medal | B29C 65/08 156/272.2 |
| 6,406,238 B2 | * | 6/2002 | Takeuchi | H01R 4/64 411/188 |
| 6,540,462 B1 | * | 4/2003 | Bretschneider | F16B 7/005 411/301 |
| 6,685,412 B2 | * | 2/2004 | Altarac | B25B 15/005 411/403 |
| 6,817,079 B2 | * | 11/2004 | Leistner | B23P 19/062 29/243.5 |
| 2004/0033122 A1 | * | 2/2004 | Hill | F16B 35/047 411/301 |
| 2004/0141806 A1 | * | 7/2004 | Wake | F16B 43/001 403/408.1 |
| 2005/0117997 A1 | * | 6/2005 | Pinzl | F16B 37/005 411/367 |
| 2007/0286700 A1 | * | 12/2007 | Ladouceur | B21K 1/66 411/333 |
| 2008/0240883 A1 | * | 10/2008 | Walling | F16B 37/125 411/178 |
| 2008/0310933 A1 | * | 12/2008 | Ricciardo | F16B 39/10 411/161 |
| 2009/0067921 A1 | * | 3/2009 | Ito | F16B 5/0283 403/408.1 |
| 2010/0104396 A1 | * | 4/2010 | Hama | F16B 33/006 411/385 |
| 2011/0243683 A1 | * | 10/2011 | Howe | F16B 13/0833 411/24 |
| 2012/0243960 A1 | * | 9/2012 | Ivinson | F16B 37/0842 411/427 |
| 2013/0002103 A1 | * | 1/2013 | Peng | F16B 37/122 312/223.1 |
| 2013/0330149 A1 | * | 12/2013 | Chen | F16B 37/005 411/360 |
| 2014/0026360 A1 | * | 1/2014 | Fleck | B25G 3/00 16/110.1 |
| 2014/0271030 A1 | * | 9/2014 | Yamaguchi | F16B 37/005 411/313 |
| 2015/0043994 A1 | * | 2/2015 | Luepke | F16B 13/02 411/510 |
| 2015/0233411 A1 | * | 8/2015 | Eggers | F16B 39/04 29/456 |
| 2015/0247523 A1 | * | 9/2015 | Yamaguchi | F16B 37/122 411/340 |
| 2017/0114820 A1 | * | 4/2017 | Friedl | F16B 33/006 |

FOREIGN PATENT DOCUMENTS

| | | |
|---|---|---|
| JP | S54-160955 A | 12/1979 |
| JP | S55-127114 U | 9/1980 |
| JP | S56-55105 U | 5/1981 |
| JP | S58-57170 U | 4/1983 |
| JP | S59-121506 U | 8/1984 |
| JP | 2006-316818 A | 11/2006 |

* cited by examiner

BOSS FOR SELF-TAPPING SCREW

CROSS-REFERENCE TO RELATED APPLICATION

This application claims priority from Japanese Patent Application No. 2014-238712 filed on Nov. 26, 2014, the content of which is incorporated herein by reference in its entirety.

FIELD OF DISCLOSURE

The disclosure relates to a boss for a self-tapping screw, the boss including a pilot hole into which a self-tapping screw (refer to, for example, Japanese Industrial Standards ("JIS") B 0101) is screwed.

BACKGROUND

A known boss for a self-tapping screw includes a large-diameter portion. The large-diameter portion is provided at an upper end portion of the boss and has a greater diameter than a pilot hole of the boss. The large-diameter portion prevents cracks (e.g., breaks) from being made from the upper end portion of the boss when a self-tapping screw is screwed into the boss.

SUMMARY

As a method for reducing or preventing cracks in the boss, the thickness (e.g., wall thickness) of the boss is increased to increase the strength of the boss. If a boss with a greater thickness is manufactured by, for example, injection molding, excessive localized shrinking of material (so-called "sink marks") may readily occur, which may cause a diameter of the pilot hole to be increased.

If the diameter of the pilot hole is increased, sufficient percentage of thread engagement (refer to, for example, JIS B 0101) may not be obtained when a self-tapping screw is screwed into the boss, resulting in insufficient tightening force.

In view of the above drawbacks, one or more aspects of the disclosure is to reduce or prevent, when a self-tapping screw is screwed into a boss, cracks in the boss and significant reduction in tightening force of the self-tapping screw.

According to an aspect of the disclosure, a boss for a self-tapping screw includes a main body having a central axis, an inner peripheral surface, and an outer peripheral surface, the inner peripheral surface and the outer peripheral surface extending parallel to the central axis; a plurality of reinforcing ribs connected with the outer peripheral surface of the main body, the plurality of reinforcing ribs each having a plate-like shape, the plurality of reinforcing ribs being integrally formed of resin with the main body; and a plurality of inner wall portions extending parallel to the central axis of the main body, each of the plurality of inner wall portions being disposed at a portion of the inner peripheral surface opposite to a corresponding one of the plurality of reinforcing ribs across the main body, each of the plurality of inner wall portions having an inner wall surface constituting a part of the inner peripheral surface of the main body. Each of the plurality of inner wall portions includes a specific portion opposite to the corresponding one of the plurality of reinforcing ribs across the main body, the specific portion being closer to the central axis than other portions of the each of the inner wall portions.

As the main body is reinforced by the reinforcing ribs, cracks on the main body may be reduced when a self-tapping screw is screwed in the boss.

Each of the plurality of inner wall portions is disposed at a portion of the inner peripheral surface opposite to a corresponding one of the plurality of reinforcing ribs across the main body. With this structure, even if the portions of the inner circumferential surface have excessive localized shrinking of material, significant increase in the diameter of a pilot hole may be reduced or prevented. Thus, significant reduction in the percentage of thread engagement with a self-tapping screw may be reduced or prevented. Accordingly, significant reduction in tightening force by the self-tapping screw may be reduced or prevented.

DETAILED DESCRIPTION

Figure 1:
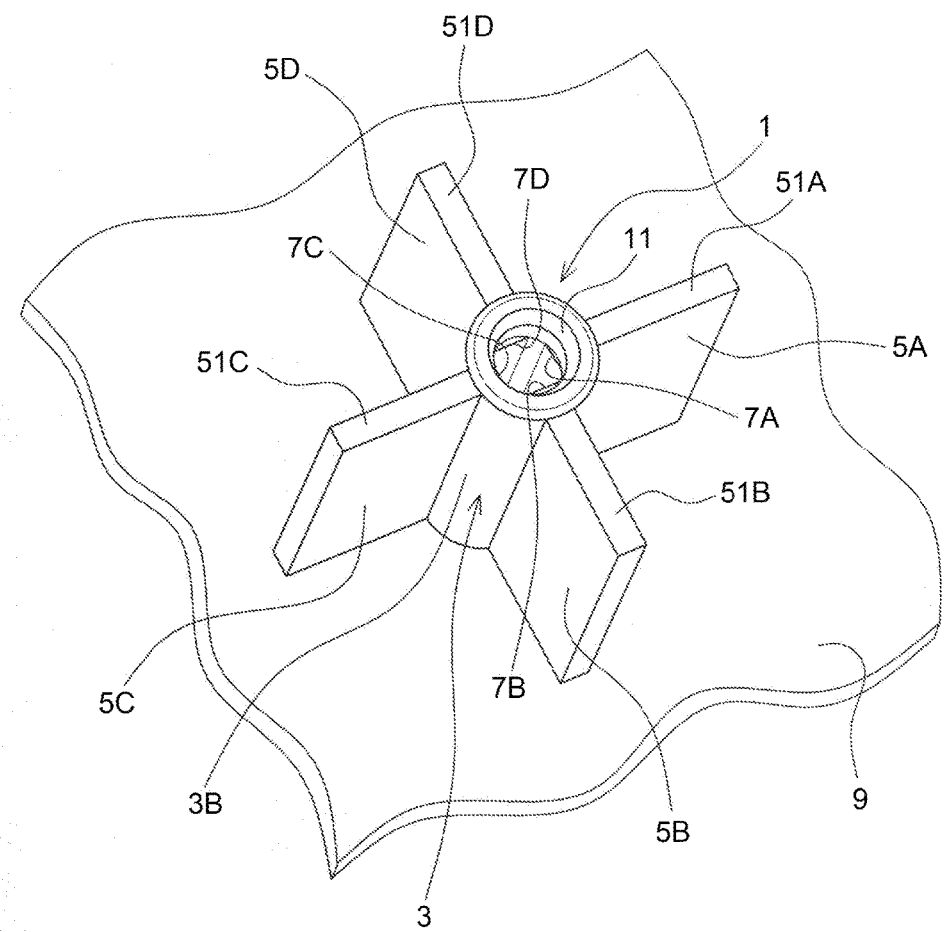
FIG. 1 is a perspective view of a boss for a self-tapping screw according to a first illustrative embodiment of the disclosure.

Illustrative embodiments described below are merely examples. The features of the invention defined in claims are not limited to the specific means, structures and the like described below in the illustrative embodiments.

In the illustrative embodiments, a boss for a self-tapping screw according to the disclosure is applied to an image forming apparatus, e.g., a printer. In one example, a frame or an exterior cover of the image forming apparatus serves as a base portion of the boss for a self-tapping screw.

The illustrative embodiments are described in detail below with reference to the accompanying drawings. Directional arrows are added to the drawings for easier understanding of relationships among the drawings. The disclosure is not limited to the directions defined in the drawings. A member or part denoted with a reference numeral is provided at least one, except that the terms "a plurality of", "two or more" and the like are used.

First Illustrative Embodiment

1. Structures of Boss for Self-Tapping Screw

Figure 2:
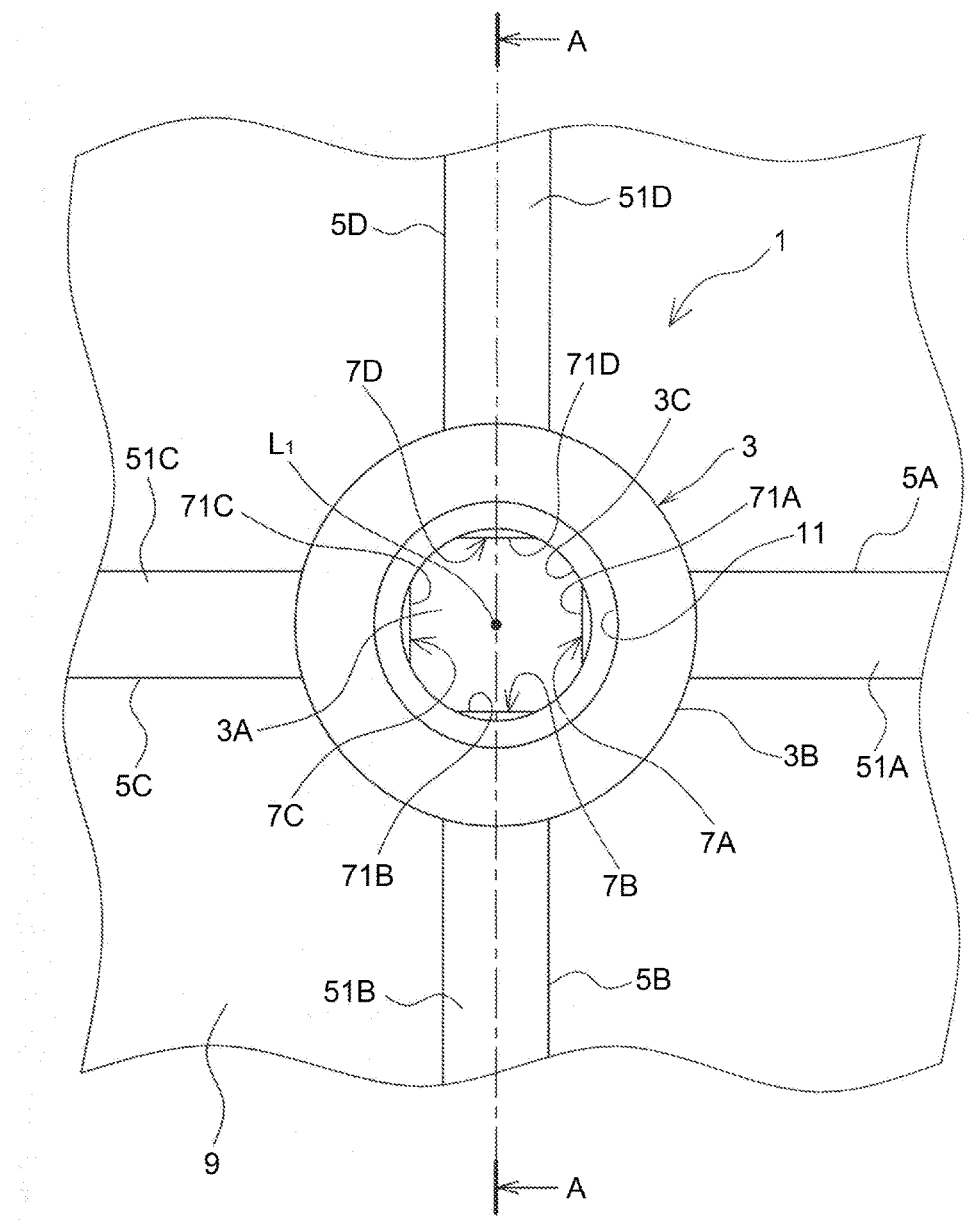
FIG. 2 is a top view of the boss for a self-tapping screw according to the first illustrative embodiment of the disclosure.

As depicted in FIGS. 1 and 2, a boss 1 for a self-tapping screw includes a tubular portion 3, a plurality of reinforcing ribs 5A, 5B, 5C and 5D, and a plurality of inner wall portions 7A, 7B, 7C and 7D. The tubular portion 3, the reinforcing ribs 5A-5D, and the inner wall portions 7A-7D are integrally formed of resin with a base portion 9. In the illustrative embodiment, high-impact polystyrene (HIPS) or ABS is used as resin material. The tubular portion 3 is an example of a main body. The main body may have tubular shape or other shape including triangular, square, hexagonal, octagonal, and the like.

Figure 3:
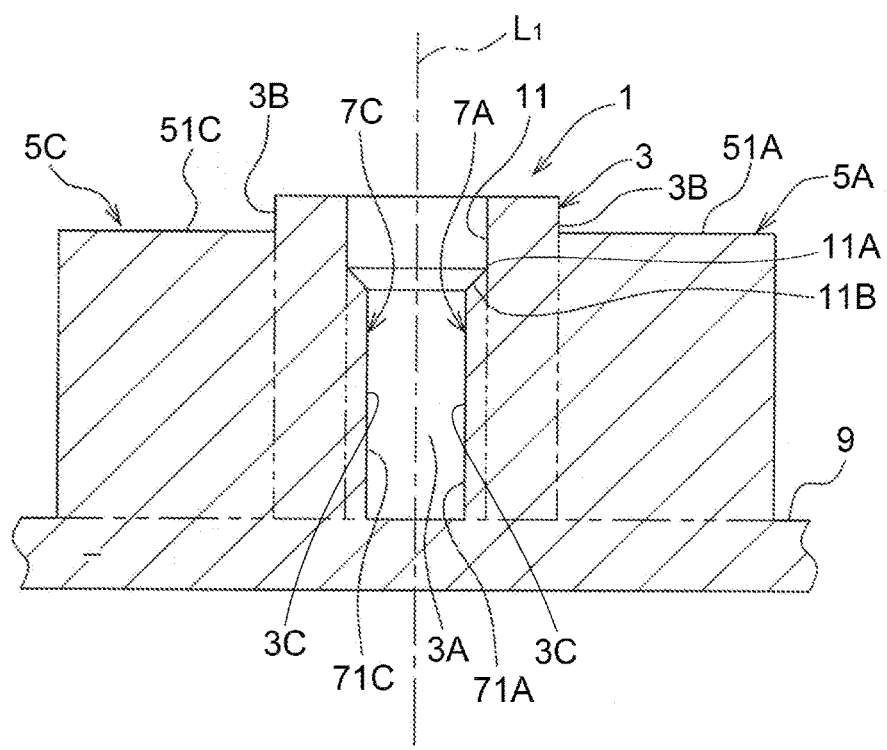
FIG. 3 is a cross-sectional view of the boss for a self-tapping screw according to the first illustrative embodiment of the disclosure.

As depicted in FIG. 3, the tubular portion 3 is a tubular-shaped portion (e.g., a cylindrical shape in the illustrative embodiment) protruding from the base portion 9. The tubular portion 3 has a pilot hole 3A into which a self-tapping screw (not depicted) is screwed. The self-tapping screw has a tapping function to cut threads, as specified in, for example, Japanese Industrial Standards ("JIS") B 0101.

The pilot hole 3A is a hole that has a diameter smaller than an outside diameter (e.g., a major diameter) of a screw and greater than a root diameter (e.g., a minor diameter) of the screw, and no internal threads (refer to, for example, JIS B 0104).

As depicted in FIG. 1, each of the reinforcing ribs 5A-5D is a plate-shaped portion. Each reinforcing rib 5A-5D is a reinforcing member connecting an outer wall surface 3B (as an example of an outer peripheral surface) of the tubular portion 3 and the base portion 9. As depicted in FIG. 2, the reinforcing ribs 5A-5D are equiangularly spaced from each other on the outer wall surface 3B. In the illustrative embodiment, four reinforcing ribs 5 are spaced 90 degrees apart from each other.

An inner circumferential surface 3C is an example of an inner peripheral surface and is located between a large-diameter portion 11 and the base portion 9. Each of the inner wall portions 7A-7D is disposed at a portion of the inner circumferential surface 3C of the tubular portion 3 opposite (across the tubular portion 3) to a corresponding one of the reinforcing ribs 5A-5D (refer to FIGS. 2 and 3).

As depicted in FIG. 3, each of the inner wall portions 7A-7D has a corresponding one of inner wall surfaces 71A-71D, and extends parallel to a central axis L1 of the inner circumferential surface 3C of the tubular portion 3. Each of the inner wall surfaces 71A-71D according to the illustrative embodiment has a strip-shaped flat surface and constitutes a part of the inner circumferential surface 3C of the tubular portion 3, as depicted in FIGS. 2 and 3. In other words, the inner circumferential surface 3C of the tubular portion 3 includes the inner wall surfaces 71A-71D and defines the pilot hole 3A.

As depicted in FIG. 2, the inner wall portions 7A-7D are disposed at portions of the inner circumferential surface 3C of the tubular portion 3 corresponding to the respective reinforcing ribs 5 across the tubular portion 3. The inner wall portions 7A-7D are equiangularly spaced from each other on the inner circumferential surface 3C. In the illustrative embodiment, the inner wall portions 7A-7D are disposed facing each other across the central axis L1. For example, the inner wall portion 7A is disposed facing the inner wall portion 7C across the central axis L1, and the inner wall portion 7B is disposed facing the inner wall portion 7D across the central axis L1. In the illustrative embodiment, the number of the reinforcing ribs 5 is equal in number to the number of the inner wall portions 7 and four inner wall portions 7 are evenly spaced apart from each other (e.g., approximately, 90 degrees between the centers of the inner wall portions relative to the central axis L1).

Each of the inner wall portions 7 includes a specific portion opposite to the corresponding one of the reinforcing ribs 5 across the tubular portion 3. The specific portion is closer to the central axis L1 than other portions of each of the inner wall portions 7.

As depicted in FIG. 3, an entry side of the pilot hole 3A is provided with a large-diameter portion 11 and the inner circumferential surface 3C of the tubular portion 3 is stepped-shaped. The large-diameter portion 11 is concentric with the pilot hole 3A and has a diameter greater than that of the pilot hole 3A.

The entry side of the pilot hole 3A is an end of the inner circumferential surface 3C of the tubular portion 3, which is opposite to the base portion 9 in a direction in which the central axis L1 extends (e.g., toward an upper edge of the tubular portion 3 in FIG. 3). Hereinafter, a direction from the base portion 9 toward the large-diameter portion 11 (e.g., a direction from the lower side toward the upper side in FIG. 3) is referred to as an extending direction.

When the boss 1 is projected onto an imaginary plane parallel to the central axis L1, remote ends 51A-51D of the reinforcing ribs 5, which are remote from the base portion 9 in the extending direction, are located at positions that are at least level with a boundary portion 11A between the large-diameter portion 11 and the pilot hole 3A in the extending direction or at positions beyond the boundary portion 11A in the extending direction (e.g., toward an upper side in FIG. 3).

Central axis L1 lies in an infinite number of imaginary planes parallel to the central axis L1. However, even when the boss 1 is projected onto any of the imaginary planes parallel to the central axis L1, the remote ends 51A-51D of the reinforcing ribs 5A-5D are located at the positions level with or beyond the boundary portion 11A in the extending direction.

A conical portion 11B having a conical shape is disposed in the boundary portion 11A. The conical portion 11B includes a conical tapered surface having a hole diameter becoming smaller toward the base portion 9. The boundary portion 11A according to the illustrative embodiment includes the conical portion 11B. In the illustrative embodiment, the position of the boundary portion 11A refers to an end portion of the conical portion 11B closer to the large-diameter portion 11 (e.g., an upper end portion of the conical portion 11B in FIG. 3).

2. Features of Boss for Self-Tapping Screw According to Illustrative Embodiment

In the boss 1 for a self-tapping screw according to the illustrative embodiment, the tubular portion 3 is reinforced by the reinforcing ribs 5A-5D. Therefore, when a self-tapping screw is screwed into the boss 1, breakage (shattering, fragmenting, cracking, etc.) on the tubular portion 3 may be reduced or prevented.

In the boss 1 according to the illustrative embodiment, portions of the inner circumferential surface 3C of the tubular portion 3 corresponding to the respective reinforcing ribs 5A-5D may readily have excessive localized shrinking of material. However, in the illustrative embodiment, the inner wall portions 7A-7D are disposed at the portions of the inner circumferential surface 3C of the tubular portion 3 corresponding to the respective reinforcing ribs 5A-5D across the tubular portion 3.

With this structure, even if the portions of the inner circumferential surface 3C have excessive localized shrinking of material, significant increase in the diameter of the pilot hole 3A may be reduced or prevented. Thus, significant reduction in the percentage of thread engagement with a self-tapping screw may be reduced or prevented. Accordingly, significant reduction in tightening force by the self-tapping screw may be reduced or prevented.

The inner wall portions 7A-7D according to the illustrative embodiment are spaced from each other around the inner circumferential surface 3C such that respective inner wall surfaces 71A-71D are closer to the central axis L1 than any portion of the inner circumferential surface 3C of the tubular portion 3 located between the spaced inner wall surfaces 71A-71D. Therefore, as a self-tapping screw is screwed into the tubular portion 3, an external thread portion of the self-tapping screw bites into the inner wall portions 7A-7D. Accordingly, the self-tapping screw receives inward force from the inner wall portions 7A-7D.

At this time, such a defect that the path of the self-tapping screw is not collinear with the central axis L1 may be reduced or prevented, because the inner wall portions 7A-7D are equiangularly spaced from each other on the inner circumferential surface 3C of the tubular portion 3 in the illustrative embodiment.

For example, if the path of the self-tapping screw is collinear with the central axis L1, amounts of engagement of the self-tapping screw with the respective inner wall portions 7A-7D may differ from each other, so that sufficient tightening force may not be obtained.

On the contrary, amounts of engagement of a self-tapping screw with the respective inner wall portions 7A-7D are substantially the same in the illustrative embodiment, because the inner wall portions 7A-7D are equiangularly spaced from each other on the inner circumferential surface 3C of the tubular portion 3. Accordingly, such a defect that the path of the self-tapping screw is not collinear with the central axis L1 may be reduced or prevented, so that sufficient tightening force may be obtained.

In the illustrative embodiment, the inner wall portions 7A-7D are disposed facing each other across the central axis L1. With this structure, the inner wall portions 7A-7D are rotationally symmetrical about the central axis L1. Accordingly, such a defect that the path of the self-tapping screw is not collinear with the central axis L1 may be reduced or prevented, so that sufficient tightening force may be obtained.

In the illustrative embodiment, an end portion of the inner circumferential surface 3C of the tubular portion 3, which is opposite to the base portion 9 in the direction in which the central axis L1 extends, is stepped-shaped as the large-diameter portion 11 having a diameter greater than that of the pilot hole 3A is provided. With this structure, occurrence of cracks at the end portion of the tubular portion 3 may be reliably reduced or prevented.

For example, when a self-tapping screw is screwed into the boss 1, force in a direction to enlarge or increase an inside diameter of the tubular portion 3 (hereinafter referred to as the enlarging force) is applied to the tubular portion 3. At this time, a closed end portion of the tubular portion 3 (or the pilot hole 3A), which is closer to the base portion 9 than the end portion of the tubular portion 3 having a stepped shape, is closed by the base portion 9, but the entry side of the tubular portion 3 (or the pilot hole 3A) is open.

Therefore, the entry side of the tubular portion 3 (or the pilot hole 3A) has a lower resistance to the enlarging force than the closed end portion of the tubular portion 3 (or the pilot hole 3A) closer to the base portion 9. For example, if the same amount of enlarging force is applied to the entry side of the tubular portion 3 (or the pilot hole 3A) and the closed end portion of the tubular portion 3 (or the pilot hole 3A) closer to the base portion 9, cracks may occur at the entry side of the tubular portion 3 (or the pilot hole 3A), e.g., at an open end portion of the tubular portion 3.

Figure 4:
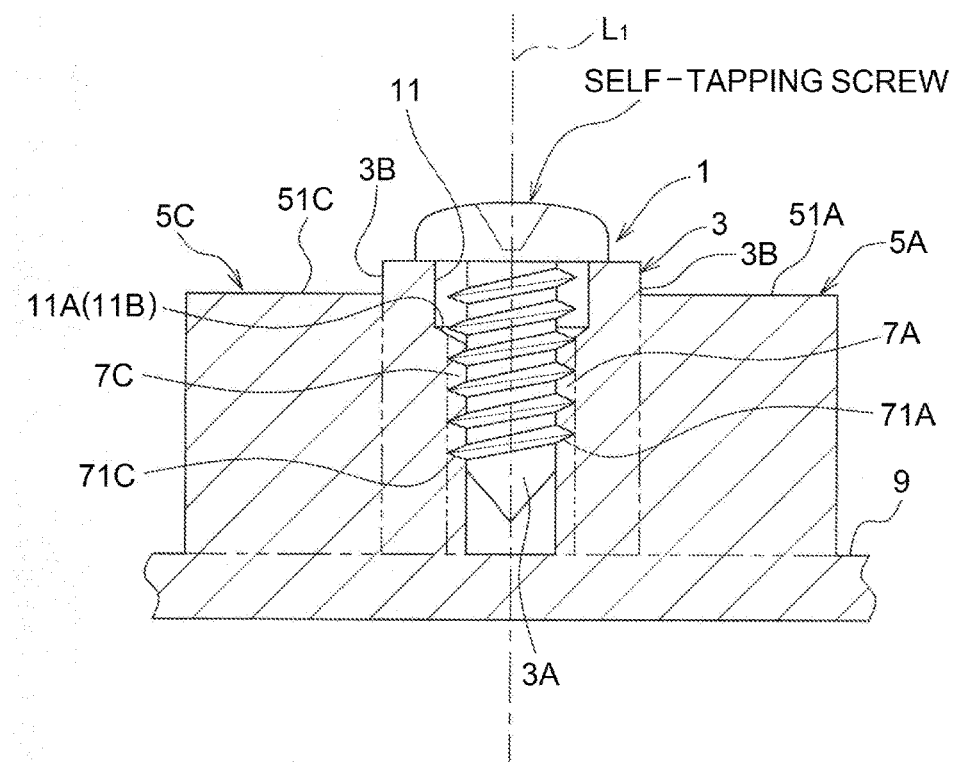
FIG. 4 is a cross-sectional view of the boss for a self-tapping screw according to the first illustrative embodiment of the disclosure.

On the contrary, the large-diameter portion 11 is provided toward the open end portion of the tubular portion 3 in the illustrative embodiment. Therefore, as depicted in FIG. 4, a portion of a self-tapping screw does not contact the tubular portion 3, or even when the self-tapping screw contacts the tubular portion 3, a contact surface pressure between the self-tapping screw and the tubular portion 3 is small. Accordingly, the enlarging force applied to the end portion of the tubular portion 3 may be reduced, and thus occurrence of cracks at the open end portion of the tubular portion 3 may be reliably reduced or prevented.

In the illustrative embodiment, when projected onto the imaginary plane parallel to the central axis L1, the remote ends 51A-51D of the respective reinforcing ribs 5 are located at the positions level with the boundary portion 11A between the large-diameter portion 11 and the pilot hole 3A or at the positions beyond the boundary portion 11A in the extending direction (e.g., the upper side in FIG. 3).

With this structure, portions of the tubular portion 3 subjected to significant stress when a self-tapping screw is screwed into the boss 1 may be reliably reinforced by the respective reinforcing ribs 5A-5D. In the illustrative embodiment, the remote ends 51A-51D of the respective reinforcing ribs 5A-5D are located at the positions beyond the boundary portion 11A in the extending direction.

In the illustrative embodiment, the conical portion 11B having a hole diameter becoming smaller toward the base portion 9 is disposed at the boundary portion 11A between the large-diameter portion 11 and the pilot hole 3A. With this structure, when a self-tapping screw is screwed into the pilot hole 3A, the screw may be reliably guided to the pilot hole 3A.

In the illustrative embodiment, the radius of the pilot hole 3A varies between a maximum distance (to the spaces between wall portions 71A-71D—identified as maximum distance portions) and a minimum distance (to the nearest portion of wall portions 71A-71D to central axis L1—identified as minimum distance portions). The minimum distance is greater than a half of a minor diameter of a self-tapping screw to be screwed in the pilot hole 3A.

For example, for a self-tapping screw with a nominal size of M3, a maximum distance of the pilot hole 3A is, for example, 1.25 mm, a difference between the maximum distance and a minimum distance of the pilot hole 3A is, for example, 5/100 mm, a width of the inner wall portion 7 is, for example, 0.7 m, and a hole diameter of the large-diameter portion 11 is, for example, 3.1 mm. The direction of pull for the boss 1 according to the illustrative embodiment is parallel to the central axis L1.

Second Illustrative Embodiment

Figure 5:
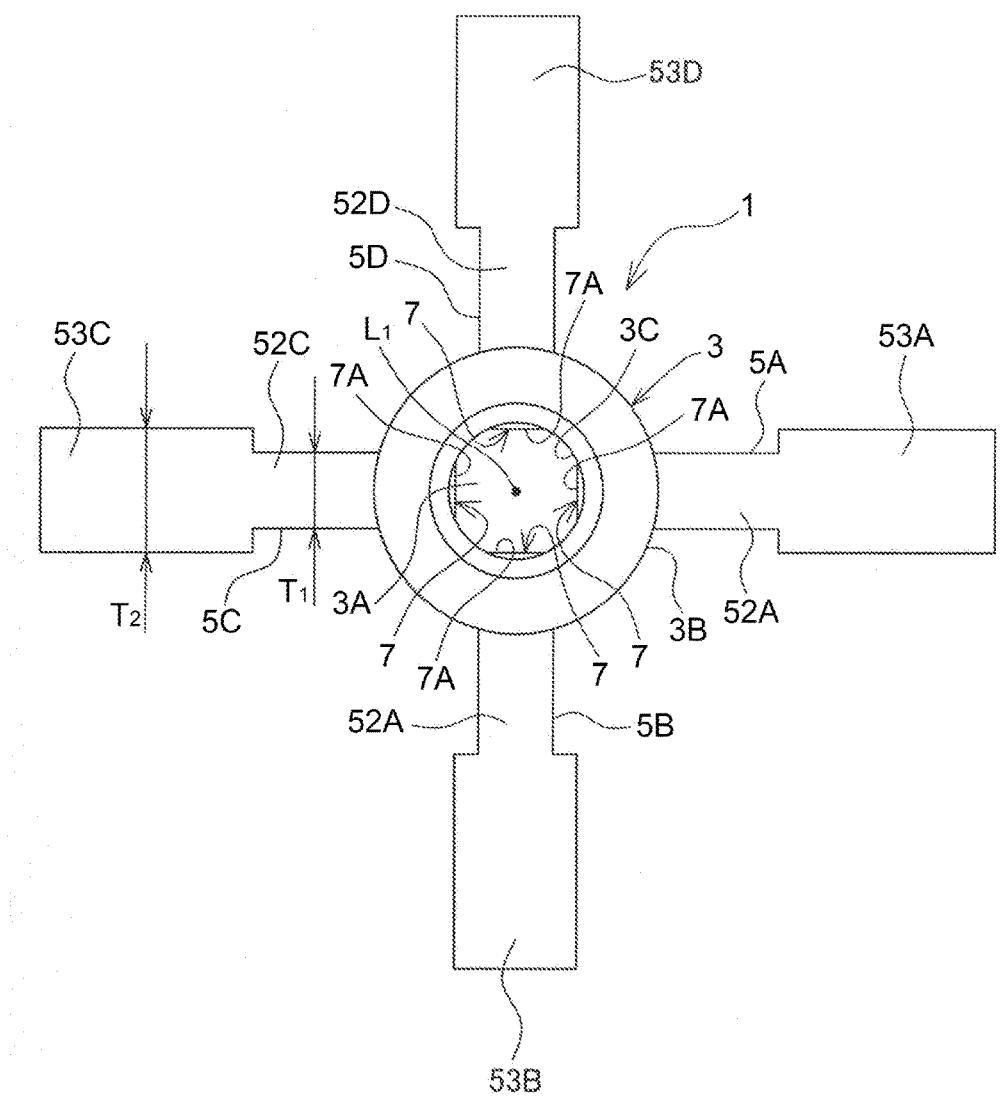
FIG. 5 is a top view of a boss for a self-tapping screw according to a second illustrative embodiment of the disclosure.

Each of the reinforcing ribs 5A-5D according to the above-described first illustrative embodiment is a plate-like member having a constant thickness. In the second illustrative embodiment, as depicted in FIG. 5, each of the reinforcing ribs 5A-5D includes a corresponding one of thinner plate portions 52A-52D and a corresponding one of thicker plate portions 53A-53D. Each of the thinner plate portions 52A-52D has a thickness different from a thickness of a corresponding thicker plate portion 53A-53D.

For example, each of the reinforcing ribs 5A-5D includes a corresponding one of the thinner plate portions 52A-52D connected to the tubular portion 3, and a corresponding one of the thicker plate portions 53A-53D whose thickness is greater than that of the corresponding thinner plate portion 52A-52D. Each of the thicker plate portions 53A-53D is located opposite to the tubular portion 3 across the corresponding thinner plate portions 52A-52D. For example, each of the thicker plate portions 53A-53D is connected to the tubular portion 3 via the corresponding thinner plate portions 52A-52D.

With this structure, the thickness of a portion of each of the reinforcing ribs 5A-5D connected to the tubular portion 3 may be reduced in the illustrative embodiment. Therefore, occurrence of excessive localized shrinking of material at an inner portion of the tubular portion 3 closer to the inner circumferential surface 3C may be reliably reduced or prevented. Accordingly, reduction in the percentage of thread engagement may be reduced or prevented without the need to excessively reduce the size of the minimum diameter of the pilot hole 3A.

In the illustrative embodiment, a thickness T1 of each thinner plate portion 52A-52D is, for example, approximately 0.7 mm, and a thickness T2 of each thicker plate portion 53A-53D is, for example, approximately 1.2 mm.

Other Embodiments

According to the above-described illustrative embodiments, the conical portion 11B is disposed at the boundary portion 11A. However, the disclosure is not limited thereto. In another embodiment, a boundary portion 11A having a stepped shape may be provided without providing the conical portion 11B.

In the above-described illustrative embodiments, the large-diameter portion 11 is provided. However, the disclosure is not limited thereto. In another embodiment, the large-diameter portion 11 may be omitted.

According to the above-described illustrative embodiments, the reinforcing ribs 5 each have a rectangular plate shape. However, the disclosure is not limited thereto. For example, the reinforcing ribs 5 may have, for example, a triangular plate shape.

In the above-described illustrative embodiments, four inner wall portions 7 and four reinforcing ribs 5 are provided. However, the disclosure is not limited thereto. In another embodiment, at least two inner wall portions 7 and at least two reinforcing ribs 5 may be provided.

Figure 6:
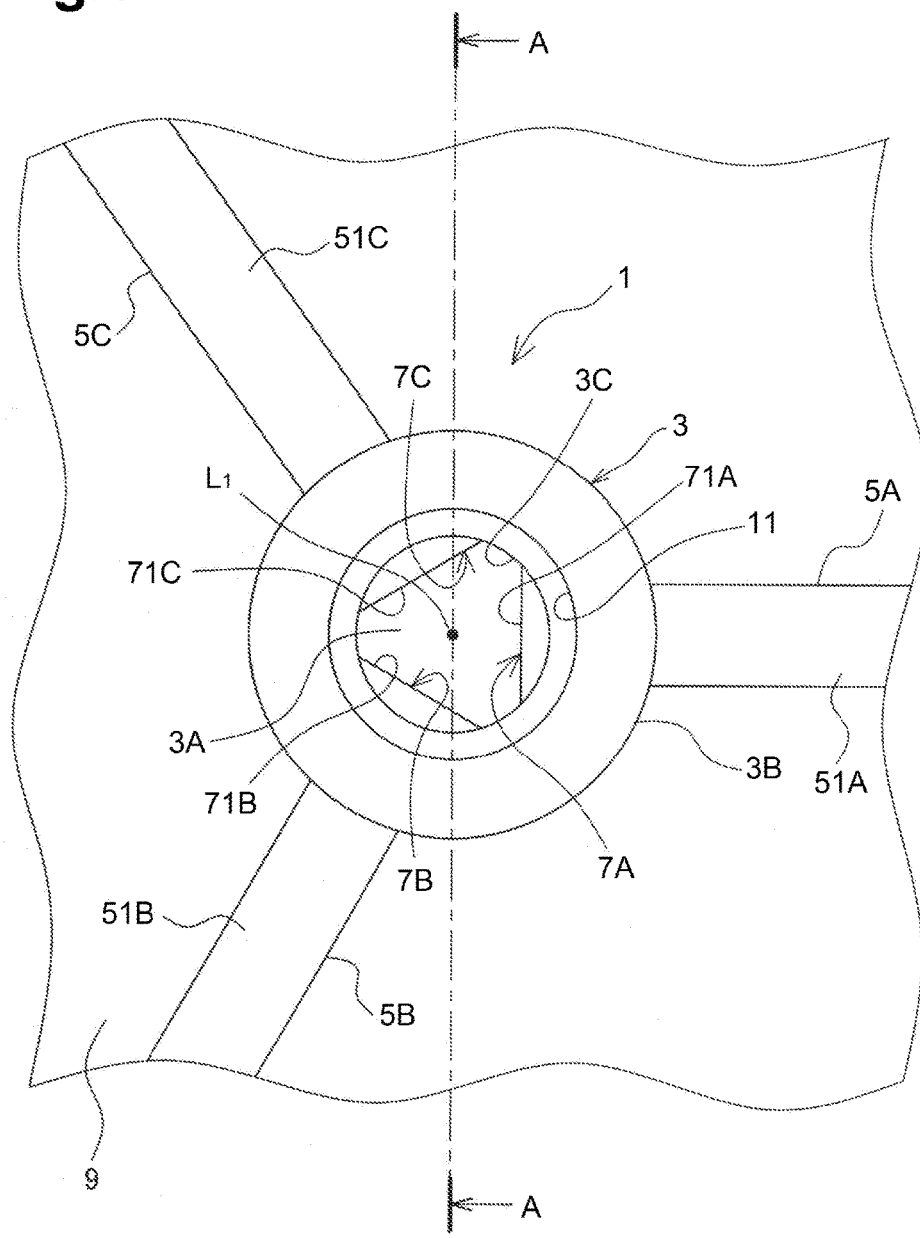
FIG. 6 is a top view of a boss for a self-tapping screw according to another illustrative embodiment of the disclosure.

The number of the inner wall portions 7 and the number of the reinforcing ribs 5 are not limited to an even number but may be an odd number. In FIG. 6, three inner wall portions 7A-7C and three reinforcing ribs 5A-5C are provided with 120 degrees apart from each other.

The inner wall surfaces 71A-71D of the respective inner wall portions 7A-7D are not limited to flat surfaces. The inner wall surfaces 71A-71D may be curved surface, arced surfaces, rippled surfaces, and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A boss for a self-tapping screw comprising:
   a main body having a central axis, an inner peripheral surface, and an outer peripheral surface, the inner peripheral surface and the outer peripheral surface extending parallel to the central axis;
   a plurality of reinforcing ribs connected with the outer peripheral surface of the main body, the plurality of reinforcing ribs each having a plate shape, the plurality of reinforcing ribs being integrally formed of resin with the main body; and
   a plurality of inner wall portions extending parallel to the central axis of the main body and provided identically in number to the plurality of reinforcing ribs, each individual inner wall portion of the plurality of inner wall portions being disposed at a portion of the inner peripheral surface opposite to an individual corresponding one of the plurality of reinforcing ribs across the main body, each individual inner wall portion of the plurality of inner wall portions having an inner wall surface constituting a part of the inner peripheral surface of the main body,
   wherein each individual inner wall portion of the plurality of inner wall portions includes a specific portion opposite to the individual corresponding one of the plurality of reinforcing ribs across the main body, the specific portion being closer to the central axis than other portions of each individual inner wall portion of the plurality of inner wall portions, and
   wherein each of the plurality of reinforcing ribs includes a thinner plate portion connected to the main body and a thicker plate portion being greater in thickness than the thinner plate portion, the thicker plate portion being connected to the thinner plate portion opposite to the main body with respect to the thinner plate portion.

2. The boss for a self-tapping screw according to claim 1, wherein the plurality of inner wall portions are equiangularly spaced from each other around the inner peripheral surface of the main body.

3. The boss for a self-tapping screw according to claim 1, wherein the plurality of inner wall portions includes at least a first inner wall portion and a second inner wall portion facing the first inner wall portion across the central axis.

4. The boss for a self-tapping screw according to claim 1, wherein the inner wall surface of each individual inner wall portion of the plurality of inner wall portions includes a flat surface.

5. The boss for a self-tapping screw according to claim 1,
   wherein the inner peripheral surface of the main body defines a pilot hole in which a self-tapping screw is screwed, and
   wherein the boss includes a large-diameter portion having a diameter greater than that of the pilot hole, the large-diameter portion being provided at an end portion of the main body and continuous with the pilot hole.

6. The boss for a self-tapping screw according to claim 5,
   wherein the boss includes a boundary portion between the large-diameter portion and the pilot hole in an extending direction, and
   wherein, when the boss is projected onto a plane parallel to the central axis, an end of each of the plurality of reinforcing ribs in the extending direction from the pilot hole toward the large-diameter portion is located at a position beyond the boundary portion.

7. The boss for the self-tapping screw according to claim 6, wherein the boundary portion between the large-diameter portion and the pilot hole includes a conical portion having a hole diameter becoming smaller toward the pilot hole.

8. The boss for a self-tapping screw according to claim 1, wherein the main body is tubular-shaped.

9. The boss for a self-tapping screw according to claim 1,
   wherein the plurality of inner wall portions are spaced from each other around the inner peripheral surface, and
   wherein the plurality of inner wall portions are disposed such that the inner wall surface of each individual inner wall portion of the plurality of inner wall portions is closer to the central axis than any portion of the inner peripheral surface of the main body located between the spaced inner wall portions.

10. The boss for a self-tapping screw according to claim 1, wherein each of the plurality of reinforcing ribs has a width smaller than a width of a corresponding one of the plurality of inner wall portions.

\* \* \* \* \*